(12) United States Patent
Chavali

(10) Patent No.: US 11,991,168 B2
(45) Date of Patent: May 21, 2024

(54) AUTHENTICATION BYPASS INFRASTRUCTURE

(71) Applicant: Bank of America Corporation, Charlotte, NC (US)

(72) Inventor: Srinivas Chavali, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 269 days.

(21) Appl. No.: 17/746,120

(22) Filed: May 17, 2022

(65) Prior Publication Data

US 2023/0379320 A1 Nov. 23, 2023

(51) Int. Cl.
*H04L 29/06* (2006.01)
*H04L 9/40* (2022.01)

(52) U.S. Cl.
CPC ...... *H04L 63/0838* (2013.01); *H04L 63/0853* (2013.01)

(58) Field of Classification Search
None
See application file for complete search history.

(56) References Cited

U.S. PATENT DOCUMENTS

2008/0313719 A1* 12/2008 Kaliski, Jr. ......... H04L 63/0815 726/5
2023/0017314 A1* 1/2023 Da Rocha ............... G06F 21/31

OTHER PUBLICATIONS

"How Many Apps Are There Globally?" MobileApps.com, Apr. 19, 2021.
"Mobile App Download Statistics & Usage Statistics," https://buildfire.com/app-statistics/#:~:text=There%20are%202.87%20million%20apps.time%20comes%20from%20mobile%20apps., Retrieved on Apr. 25, 2022.

* cited by examiner

*Primary Examiner* — Andrew J Steinle
(74) *Attorney, Agent, or Firm* — Weiss & Arons LLP

(57) ABSTRACT

Due to the proliferation of protected services that are secured by password wall, a user frequently has to remember multiple complex passwords. There is a need to reduce the number of passwords and maintain adequate security of the protected services. Systems described herein may autogenerate dynamic passwords for those apps that require a password. Protected services may allow user access based on the autogenerated dynamic password. The system may include an API for interacting with multiple apps that each provide protected services. The API may provide dynamic passwords that authenticate a user to access any of the protected services provided by any of the multiple apps.

9 Claims, 4 Drawing Sheets

AUTHENTICATION BYPASS INFRASTRUCTURE

FIELD OF TECHNOLOGY

This application describes apparatus and methods for providing secure access to multiple applications without requiring separate credentials for a user to access each application.

BACKGROUND

Mobile applications or "apps" are an ever-present part of our connected lives. Available apps currently provide a wide variety of functions and services from controlling features in a car, music streaming, management of finances, planning of travel, fitness regimes and facilitating social media interactions.

About 218 billion mobile apps were downloaded to users' connected devices in 2020 from multiple app "stores" or marketplaces. An average user accesses 9 apps per day and about 30 apps per month. It is estimated that in the U.S., about 70% of engagement with digital media is spent using mobile apps and 49% of users open an app 11+ times each day.

The number of smartphone users is expected to reach 4.3 billion by 2023. This increased smartphone usage is expected to lead to a concomitant increase in the number of apps available to service the needs of mobile device users. This expected proliferation of apps has exacerbated a problem of password control and fatigue.

Many apps require a user to create a profile that will provide a customized experience to the user. Other apps require a username and password to protect data that may be accessible when using the app. For example, mobile banking has propelled progressive growth of apps providing financial services. Apps providing access to financial information must be secured against unauthorized access.

Because there are so many apps available, a user frequently has to remember multiple complex passwords. Using the same login credentials for multiple apps increases the likelihood that if the credentials of one app are compromised, a malicious actor may obtain access to numerous other apps that use the same credentials. Accordingly, there is a need to reduce the number of unique passwords a user needs to securely access apps, and yet maintain adequate security of app provided services. Accordingly, there is a need for AUTHENTICATION BYPASS INFRASTRUCTURE.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
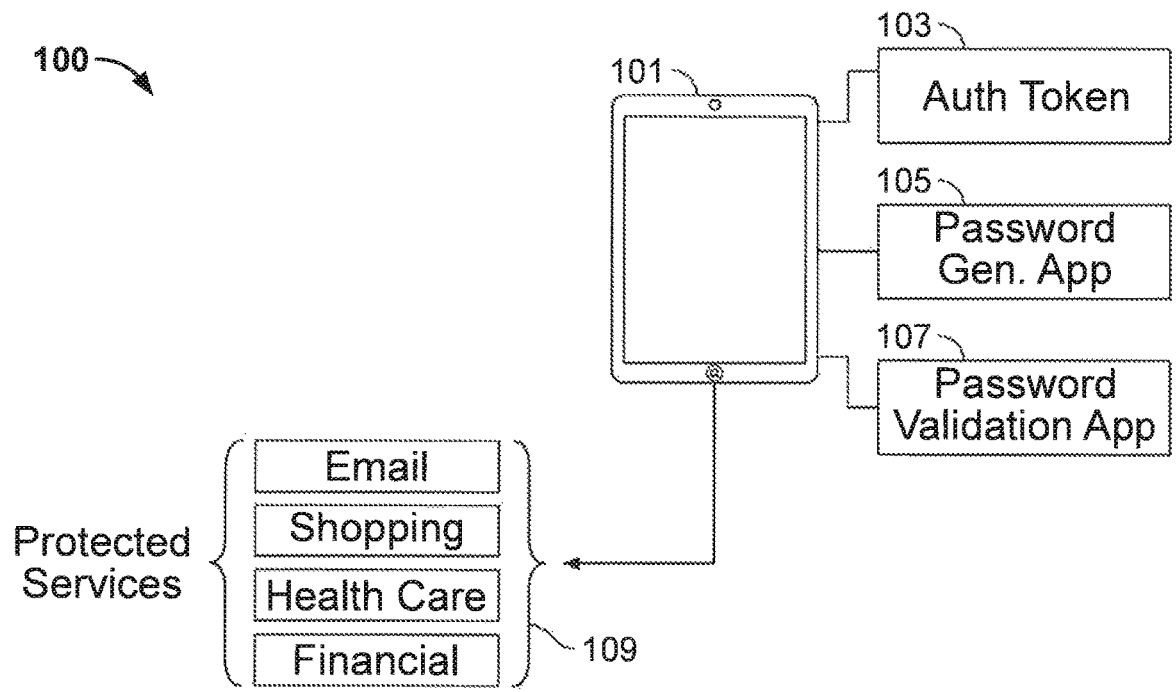
FIG. 1 shows an illustrative system in accordance with principles of the disclosure.

Apparatus for an authentication system that controls secure access to multiple protected services is provided. The authentication system may include an app that is installed on a mobile device. An app is a computer program that operates on a computer system. The computer system may be a desktop computer, mobile device wearable device or any suitable computer system. Each application may provide a suite of functions to the user. Exemplary applications include web browsers, e-mail programs, word processors, and utilities.

An app my provide access to a protected service. A protected service requires a user to provide credentials before accessing the function or service provided by the app. The app may be configured to authenticate the credentials before grating access to the protected service. The authentication system may control access to protected services provided many other apps. Each of the protected services may be secured by an independently created password that is unique to a particular app.

The authentication system may include an authentication token. The authentication token may be a cryptographic key. For example, the authentication token may be a 128-, 256-, or 512-bit random number. The authentication token may be a source authentication token represented by a mnemonic word sequence. A mnemonic word sequence makes it easier for a user to transcribe and store the source authentication token.

Creation of a mnemonic word sequence may include the following illustrative process. First a random sequence (entropy) of 128 to 256 bits is created. Next, a checksum of the random sequence is calculated by extracting a target number of bits from a SHA256 hash of the random bit sequence. The checksum is appended to the end of the random sequence. The resulting sequence is divided into segments of 11 bits. Each 11-bit segment is indexed to a dictionary of 2048 predefined words. Finally, 12 to 24 words are selected from the dictionary to represent a mnemonic word sequence corresponding to the source authentication token.

The authentication system may include a password generation application. The password generation application may autogenerate a dynamic password for accessing a requested protected service. The password generation application may generate the dynamic password using the source authentication token.

For example, the source authentication token may be used as a seed to generate a dynamic password. The source authentication token may be input into a one-way hash function that will generate the dynamic password. The dynamic password may be one value in a sequence of values generated based on inputting the source authentication token into a hash function. The dynamic sequence of values may be generated by inputting the source authentication token into a one-way hash function. Each value in the sequence may include numbers, letters or any other characters.

Multiple dynamic passwords may be generated using the source authentication token. As long as the sequence can be recreated using the source authentication token, all subsequently generated dynamic passwords can also be regenerated. The ability to dynamically regenerate a sequence of values based on a source authentication token facilitates back up, restoring, exporting, and importing thousands or even millions of dynamically generated passwords by transferring only the source authentication token.

The dynamic password may not be stored locally on a mobile device. A dynamic password may be deleted after using the dynamic password to access a protected service accessible via an app. In some embodiments, the dynamic password may be a onetime password. The onetime password may not be used a second time to access the protected service.

Some embodiments may include deleting the dynamic password after accessing a protected service. However, the system may regenerate a deleted dynamic password. The system may regenerate at least part of the sequence of values to generate the $n^{th}$ dynamic password in the sequence of values needed to access protected service provided by a particular app.

For example, the dynamic password for a target app may be the 15th value in a sequence of values generated using the source authentication token as a seed. Although the dynamic password for a target app may not be stored locally on a user's device, when a user attempts to access the target app, the system may generate on-demand the needed 15th value. The 15th value will then be used to access the protected services provided by the app. After the 15th value is used to gain access to the app, the system may delete the 15th value.

Deleting the 15th value may reduce likelihood that the 15th value will be intercepted or accessed by a malicious actor or cybercriminal. Deleting the 15th value may increase security of the app and data associated with the protected service. Despite deleting the 15th value, the capability of dynamically regenerating the 15th value as needed secures the app and data associated with the protected service without imposing a burden on the user to track and securely store the 15th value for future use.

The system may include a password validation application. The password validation application may receive the dynamic password. The password validation application may validate the dynamic password by confirming that the dynamic password has been generated using the source authentication token as the seed. The password validation application may generate a sequence that includes the $n^{th}$ value needed to access a target app. The password validation application may provide or deny access to the requested protected service based on validating the dynamically generated password.

The password generation application may require a second-factor authentication before autogenerating a dynamic password for the requested protected service. The second-factor authentication may include an input manually provided by a user. Exemplary manual inputs may include a biometric feature, or entry of a onetime password provided to the user in response to receiving a request for access to the protected service.

The system may include a frontend lock-box application. The frontend lock-box application may secure access to the password generation application. The frontend lock-box application may store a source authentication token. The frontend lock-box application may be a digital wallet. The frontend lock-box application may be installed on a hardware wallet that is not connected to the internet.

A hardware wallet is designed to be immune to hacking. When the hardware wallet is linked to a mobile device, access to the source authentication token stored in the hardware wallet is performed "in-device." Therefore, the source authentication token stored in the hardware wallet will not be viewable even if a screen of the mobile device is visible while generating the $n^{th}$ value needed as a dynamic password to access a protected service.

The frontend lock-box application may be a web-based digital wallet. The source authentication token may be stored online. Access to the source authentication token may be provided via the web-based wallet. The frontend lock-box application may itself be an app installed on a mobile device.

A digital wallet may link a source authentication token to a protected service. For example, an app that provides access to a requested protected service may interact with a web-based digital wallet to obtain credentials generated based on a source authentication token stored controlled by the web-based digital wallet. Based on the credentials generated by the source authentication token, the receiving app may determine whether to grant or deny access to the requested protected service.

Access to a digital wallet and the source authentication token stored therein may be controlled by the authentication system. The frontend lock-box application may be a component of the authentication system. The frontend lock-box application may require a biometric feature or other credentials to generate dynamic passwords using the source authentication token. The frontend lock-box application may be compatible with web3 protocols for operation on publicly accessible distributed ledgers. An app that provides the protected service may be a decentralized application operating on the publicly accessible distributed ledger.

A distributed ledger system may include a decentralized and tamperproof database. The tamperproof database may store electronic data records. Records stored on a distributed ledger may gathered into "blocks." A complete copy of the electronic records stored within the database may be stored on multiple computer systems. Each computer system that stores a complete copy of the database may be a "node."

Each record or block of records stored on the distributed ledger may be linked or "chained" (hence the term "blockchain" for distributed ledgers that store records in blocks) to another record or block such that a change to information in any single record triggers a change to all records linked to the changed record. Each record stored within the distributed ledger may include data and metadata. Metadata may include a reference to another record in the chain and a unique identifier generated based on metadata in another block.

Records may be linked to one another and secured using cryptography. The unique identifier associated with a record may be an output of a hash function. A change of even one letter in contents of a record may result in a different output of the hash function. Thus, for a malicious node to alter a record stored in the distributed ledger, the malicious node would need to change all records that have been, and will be, subsequently linked to the changed record. As will be explained below, a consensus mechanism for changing records stored on a distributed ledger makes any such effort by a malicious node unfeasible. Therefore, the distributed ledger a provides tamperproof and auditable storage of records.

A distributed ledger system may include protocols that allow records to be audited by any node. However, records may only be added to the distributed ledger when nodes responsible for maintaining records stored in the distributed ledger reach an agreement in accordance with a consensus mechanism in effect for the distributed ledger.

One exemplary consensus mechanism is proof of work. Each node that wises to add a new record to the distributed ledger must successfully solve a computationally intensive task before being authorized to add the new record. The proof of work is typically complex to solve and at the same time easily verifiable by other nodes after completion. This dichotomy ensures that only one node is authorized to add new records and that all other nodes can easily verify that the new records have been properly linked to prior records.

The computationally intensive nature of the proof of work process provides tamperproof and auditable storage of records. It is computationally expensive for a malicious node to modify records and attempt to corrupt contents of records stored on the distributed ledger. Other nodes on the network continuously generate new records, outrunning the malicious node in the process of adding new records to the distributed ledger system. Therefore, a reliable branch of blocks or other repository of records will grow faster than any new (and possible fraudulent) records added to the distributed ledger by the malicious node. Nodes participating the distributed ledger system are programmed to recognize the largest record repository on the network as the authoritative record source. Nodes will therefore invalidate any smaller repositories created by the malicious node.

In order for a malicious node to successfully add a manipulated record to the distributed ledger system, it would be necessary for the malicious node to solve the proof of work faster than the rest of nodes on distributed ledger system. On a distributed ledger system, this is structured to be computationally too expensive for the malicious node.

Accomplishing this feat requires the malicious node to have control of at least 51% of the computing resources in use to maintain the distributed ledger system. The distributed ledger system may use any suitable consensus mechanism that maintain integrity of records stored on the distributed ledger. Other exemplary consensus mechanisms may include Delegated Proof of Stake, Transaction as Proof of Stake or Delegated Byzantine Fault Tolerance.

The distributed ledger may be a public or nonpermissioned distributed ledger. A public distributed ledger does not have restrictions on nodes that may participate in the a consensus mechanism for adding a new record or block. The distributed ledger may be a private or permissioned distributed ledger. A private distributed ledger may include restrictions on nodes that may participate in the consensus mechanism for adding a new record or block.

A distributed ledger may utilize a combination of private and public nodes. For example, the distributed ledger may require a threshold number of private and/or public nodes to approve a new record before recording the record to the distributed ledger. In other embodiments, a new record may only be added to the distributed ledger when the consensus mechanism is successfully executed by private nodes. Utilization of private nodes to execute the consensus mechanism may allow a record to be added (or rejected) faster than wholly public distributed ledgers.

The authentication system may include a backend lock-box application. The backend lock-box application may link a protected service or app interface for accessing the protected service, to the frontend lock-box application that controls access to a source authentication token. The source authentication token may be a private cryptographic key. The private cryptographic key may be used by the password generation app to generate a dynamic password.

A public cryptographic key may be paired to the private cryptographic key. The public cryptographic key may be derived from the private cryptographic key. A mathematical relationship may link the public and the private keys. The mathematical relationship may allow the private key to generate a dynamic password that can be validated using the public key without revealing the private key.

A dynamic password may be generated by inputting a message into a hash function. The message may include input provided to a protected service. For example, the message may include details of a financial transaction, a username, a randomly generated string, a web address, email, document, picture, or any other type of data.

An output of a hash function may be a fixed-length string of numbers and letters. The fixed-length string is unique to the message input into the hash function. A hash function is a one-way function. A hash output computed using the hash function cannot be reversed to decipher another hash input that would generate an identical hash output. Illustrative hash functions include Secure Hash Algorithm-1 (SHA-1), the Secure Hashing Algorithm-2 family (SHA-2 and SHA-256), and Message Digest 5 (MD5).

Access to a private cryptographic key may be controlled by the frontend lock-box application. The frontend lock-box application may keep the private cryptographic key secret. For example, the frontend lock-box application may require credentials biometric, password, etc. . . . ) to access the private key. The backend lock-box application may store a public cryptographic key that is paired to the private cryptographic key. The backend lock-box application may use the public cryptographic key to validate a dynamic password generated by the private cryptographic key.

A dynamic password may be encrypted using the private cryptographic key stored in the frontend lock-box application. An app that provides a protected service may authenticate the dynamic password using a public cryptographic key. To validate authenticity of the message, an app that provides a protected service may use the paired public key to decrypt the encrypted dynamic password. The app uses the same hashing function that generated the original hash output (using the message as input to the hash function) to generate a new one-way hash output of the decrypted dynamic password. Information about the hashing function used to generate the dynamic password and the public key may be sent to the app along with the encrypted dynamic password.

Finally, the receiving app compares the decrypted hash output and the newly generated hash output. If they are identical, the message is authentic and has been generated using the source authentication token. If the hash outputs do not match, the message may have been tampered with after it was sent, or the dynamic password may have been created with a private key that does not correspond to the public key transmitted to the receiving app.

A private key may be derived from a source authentication token. For example, a private key may be the $n^{th}$ value in a sequence of values generated by inputting a source authentication token into a one-way hash function. A corresponding public key may be derived for each $n^{th}$ value private key.

The authentication system may include a first communication channel. The first communication channel may link the frontend lock-box application to the backend lock-box application. The first communication channel may be utilized to provide the backend lock-box application with the $n^{th}$ value in a sequence of values generated using a source authentication token. The $n^{th}$ value may correspond to a dynamic password currently in use to access a protected service.

The first communication channel may be encrypted using a first private cryptographic key. The first private cryptographic key may be the $n^{th}$ value in a sequence of values generated using a source authentication token. The first private cryptographic key may be controlled by the frontend lock-box application. The backend lock-box application may use a first public cryptographic key paired to the first private cryptographic key to decrypt communications received from the frontend lock-box application. The first private cryptographic key may be different from the source authentication token.

The authentication system may include a second communication channel. The second communication channel may link the backend lock-box application to the protected service. The backend lock-box application may utilize the second communication channel to interact with the receiving app that provides the protected service. The backend lock-box application may utilize the second communication channel to inform the receiving app whether the credentials received from the frontend lock-box application have been authenticated and whether the requested protected service may therefore be provided to the requesting user.

The second communication channel may be encrypted using a second private cryptographic key. The first private cryptographic key may be the $i^{th}$ value in a sequence of values generated using a source authentication token. The second private cryptographic key may be controlled by the backend lock-box application. The receiving app may use a second public cryptographic key paired to the second private cryptographic key to decrypt communications received from the backend lock-box application. The second private cryptographic key may be different from the source authentication token.

A computer executable method for controlling secure access to multiple protected services is provided. Each of the multiple protected services may be provided by a different app. One or more computer systems may be configured to perform particular operations or actions by virtue of having computer executable instructions installed on a computer system that, in operation, causes or cause the computer system to perform various functions. Some or all of the computer executable instructions may be embodied in software, firmware, hardware, or a combination thereof.

The computer executable instructions may include one or more smart contracts. A smart contract may be a self-executing computer program that triggers actions at specified times and/or based on reference to the occurrence or non-occurrence of a target action or event. Smart contract may execute in a cloud computing environment that includes virtual software implementations. Smart contracts may execute in a distributed ledger environment.

Smart contracts may trigger actions based on the contents of records stored on the distributed ledger. Smart contracts may trigger actions based on detecting a message added to a distributed ledger. The message may include user provided input to, or a request for, a protected service. For example, the message may include details of a financial transaction, a username, a randomly generated string, a web address, email, document, picture, or any other type of data.

The computer executable instructions may invoke user functionality related to communication, such as email, short message service ("SMS"), and voice input and speech recognition applications. The computer-executable instructions may include program modules, executed by a processor on a computing system. Generally, program modules include routines, programs, objects, components, data structures, etc. that perform particular tasks or implement particular abstract data types.

The computer executable instructions may be operational with distributed computing environments where tasks are performed by remote processing devices that are linked through a communications network. In a distributed computing environment, program modules may be located in both local and remote computer storage media including memory storage devices. The computer executable instructions may rely on a network of remote servers hosted on the Internet to store, manage, and process data (e.g., "cloud computing" and/or "fog computing"). Such software implementations may be designed to run on physical hardware supplied externally by a hosting provider, a client, or other platform.

The method for controlling secure access to multiple protected services may include extracting computer readable instructions stored on a non-transitory medium and executing the computer readable instructions on a processor. Execution of the computer readable instructions by the processor may detect a request for access to a protected service.

Based on the request, the method may include accessing a webpage hosting the protected service. The method may include identifying a username input field on the webpage. The method may include identifying a password input field on the webpage. In response to identifying the username and password input fields, the method may include triggering activation of a secure application program interface ("API").

The method may include generating dynamic login information. The dynamic login information may be generated using a source authentication token. The source authentication token may be stored in a digital wallet. The dynamic login information may include a dynamic password generated using a private cryptographic key. The dynamic password may include a request for access to the protected service using a target user profile. For example, the dynamic password may be an encrypted message that includes the target user profile.

The method may include inputting the dynamic login information into the username and password input fields on the webpage that controls access to the protected service. The method may include using the secure API to submit a dynamic password to access the requested protected service. The API may be secured using private and public cryptographic keys.

The secure API may provide a communication channel for the digital wallet to communicate with the app providing the protected service. The secure API may be accessible from the webpage, however, there may not be any visual indication on the webpage that access to the protected service is available via the secure API. The secure API may include one or more smart contracts operating on a distributed ledger.

The computer executable method may include detecting a request for a protected service. The method may include requesting the protected service using an online-banking portal ("OBP"). The OBP may be accessible via an app operating on a mobile device. The OBP may be a first app installed on the mobile device. A second app may provide access to the requested protected service using the target user profile. The second app may be installed on the mobile device. The second app may be installed on remote computer system. Conventionally, the first and second apps may not be built to communicate or share authentication credentials with each other.

The selection of the protected service using the OBP may activate the second app that provides the protected service. The computer executable method may include using a source authentication token controlled by the first app (e.g., OBP) to access the protected service provided by the second app. Using the secure API, the first app may activate the second app. Using the secure API, the first app may submit credentials to the second app. The credentials provided by the first app may that authenticate user access to the requested protected service. The credentials may include a source authentication token or a dynamic password.

When the second app receives the credentials via the secure API, the second app may be programmed to access a backend lock-box application to validate the credentials. For example, the backend lock-box application may validate a dynamic password generated based on a source authentication token. The first app may require a biometric authentication before activating the secure API and submitting the credentials to access the protected service using the target user profile.

The computer executable method may include monitoring activity associated with the OBP. The method may include correlating the monitored activity to one or more protected services. The correlating may provide an additional layer of security that prevents unauthorized access to the protected service.

For example, based on transactions requested or conducted using the OBP, the OBP may learn to expect that a user typically executes financial transactions with a target range of values (e.g., payment or transfer amounts). The OBP may detect that a request for access to the protected service involves a transaction that is outside the target range of values. In some embodiments, the OBP may deny access to the requested protected service that involves a transaction that is outside the target range of values. In some embodiments, the OBP may request a second-factor authentication before providing credentials to the requested protected service that involves a transaction outside the target range of values.

An authentication system for controlling secure access to a first protected application is provided. The system may include a source authentication token. The source authentication token may be stored on a mobile device. The source authentication token may be stored on the mobile device within a digital wallet.

The authentication system may include a second protected application. The second protected application may be installed on the mobile device. Access to the second protected application may be secured by a username and password or other credentials. The username and password may be authenticated by a remote computer system associated with the second protected application. The username and password may not be accessible by any other apps operating on the mobile device. The username and password may not be capable of providing access to protected services provided by the first protected application.

The authentication system may include an application program interface ("API"), The API may be programmed to detect activation of the first protected application on the mobile device. After the API is activated, the API may be programmed to use the username and password associated with the second protected application to access the source authentication token stored in the digital wallet. The API may then use the source authentication token to access a service provided by the first protected application.

Thus, a user only needs to remember and secure the username and password associated with the second protected application. The API may securely manage access to other protected services and protected applications running on the mobile device by using the username and password associated with the second protected application to access the source authentication token stored in the digital wallet.

The source authentication token may then be used to authenticate user access to any of the other protected services and applications running on the mobile device.

In some embodiments, the API may require biometric authentication before using the username and password associated with the second protected application to access the source authentication token. In some embodiments, the API may bypass a username and password fields that secure access to a protected service provided by the first protected application. Instead, the API may interact with a smart contract running on a distributed ledger. The smart contract may validate credentials submitted by the API. Credentials submitted by the API may include the source authentication token stored in the digital wallet or a dynamic password generated based on the authentication token.

In some embodiments, before the API submits credentials to the second protected application, the API may check whether the first protected application has been activated by the second protected application. When the first application has been activated by the second protected application, an entry may be made to a smart contract. The API may check whether the entry is present before accessing the source authentication token stored in the digital wallet or generating a dynamic password.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative system 100. System 100 includes mobile device 101. One or more apps for accessing protected services 109 may be installed on mobile device 101. One or more apps for accessing protected services 109 may be installed on a remote computer system (not shown). A protected service may include any service that is protected by credentials such as a username and password.

System 100 includes source authentication token 103. Source authentication token 103 may be used to autogenerate a dynamic password for accessing protected service 109. An exemplary source authentication token may be 12B0aD31f483Cdf4741de8f5679A472E5fe3345G. Source Authentication token 103 may be securely stored in a digital wallet (not shown). The digital wallet may be installed on, or accessible from, mobile device 101.

System 100 includes password generation application 105. password generation application 105 may autogenerate a dynamic password using source authentication token 103.

For example, password generation application 105 may autogenerate a dynamic password using source authentication token 103 as a seed. Password generation application 105 may autogenerate an encrypted dynamic password using a public key associated with an app that provides the access to protected service 109. Password generation application 105 may autogenerate an encrypted dynamic password using a private key associated with password generation application 105.

The dynamic password generated by password generation application 105 may be validated by password validation app 107. Password validation app 107 may be configured to securely interact with an app that provides access to protected services 109.

Figure 2:
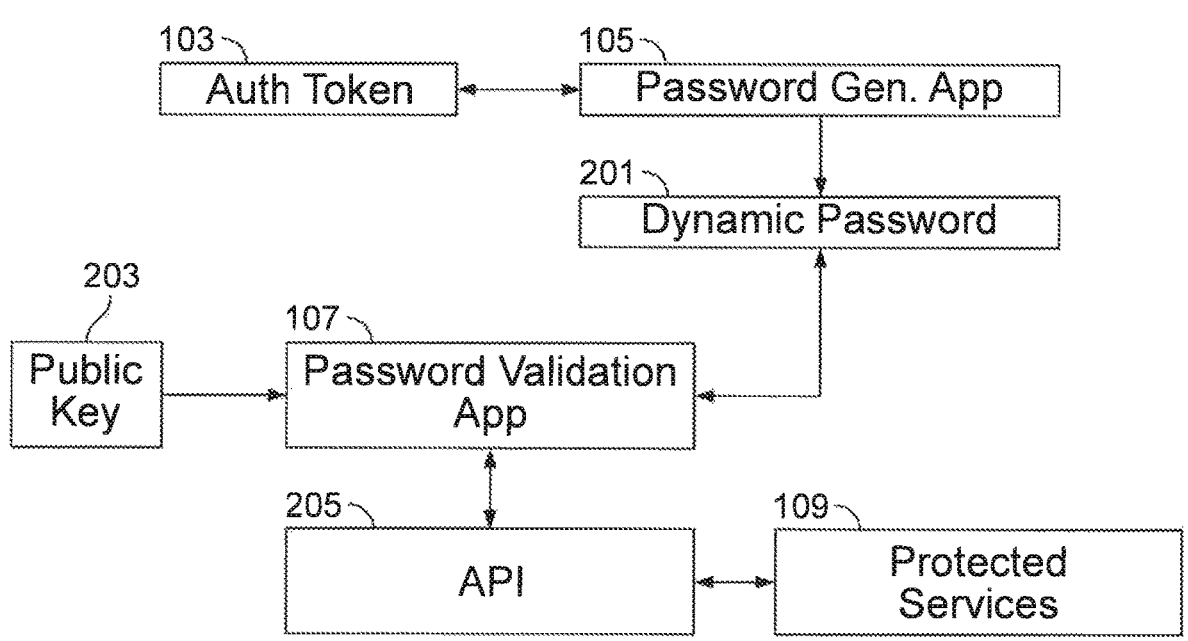
FIG. 2 shows an illustrative system in accordance with principles of the disclosure.

FIG. 2 shows illustrative system 200. System 200 shows that password generation app 105 uses source authentication token 105 to generate dynamic password 201. Dynamic password 201 may be different for each request for access to protected services 109. Source authentication token 103 may be a private cryptographic key. Dynamic password 201 may be generated based on the private cryptographic key. Generating a different dynamic password for each request for access to protected services 109 may reduce risk of unauthorized access to protected services 109.

Dynamic password 201 is validated by password validation app 107. Dynamic password validation app 107 may be a standalone app that is installed on mobile device 101. Dynamic password validation app 107 may be hosted on a remote computer system. Dynamic password validation app 107 may validate dynamic password 201 using public cryptographic key 203. Dynamic password validation app 107 may use public cryptographic key 203 to verify that dynamic password 201 has been generated using a private cryptographic key corresponding to source authentication token 103. A mathematical relationship may link the public and private keys. The mathematical relationship allows the private key to generate dynamic passwords that can be validated using public key 203 and without revealing the private key.

Dynamic password validation app 107 may use API 205 to interact with protected services 109. API 205 may facilitate access to protected services 109 based on validation of dynamic password 201 by dynamic password validation app 107. API 205 may interact with smart contracts that control access to protected services 109. The smart contracts may be programmed to allow access to protected services 109 when dynamic password 201 is validated by dynamic password validation app 107.

Generation and validation of dynamic password 201 may occur automatically, without requiring manual entry of a username and password or any other credentials. Thus, system 200 reduces the number of user credentials (e.g., usernames and passwords) that need to be protected and remembered by a user and thereby mitigates risk of a malicious actor gaining unauthorized access to protected services 109.

Figure 3:
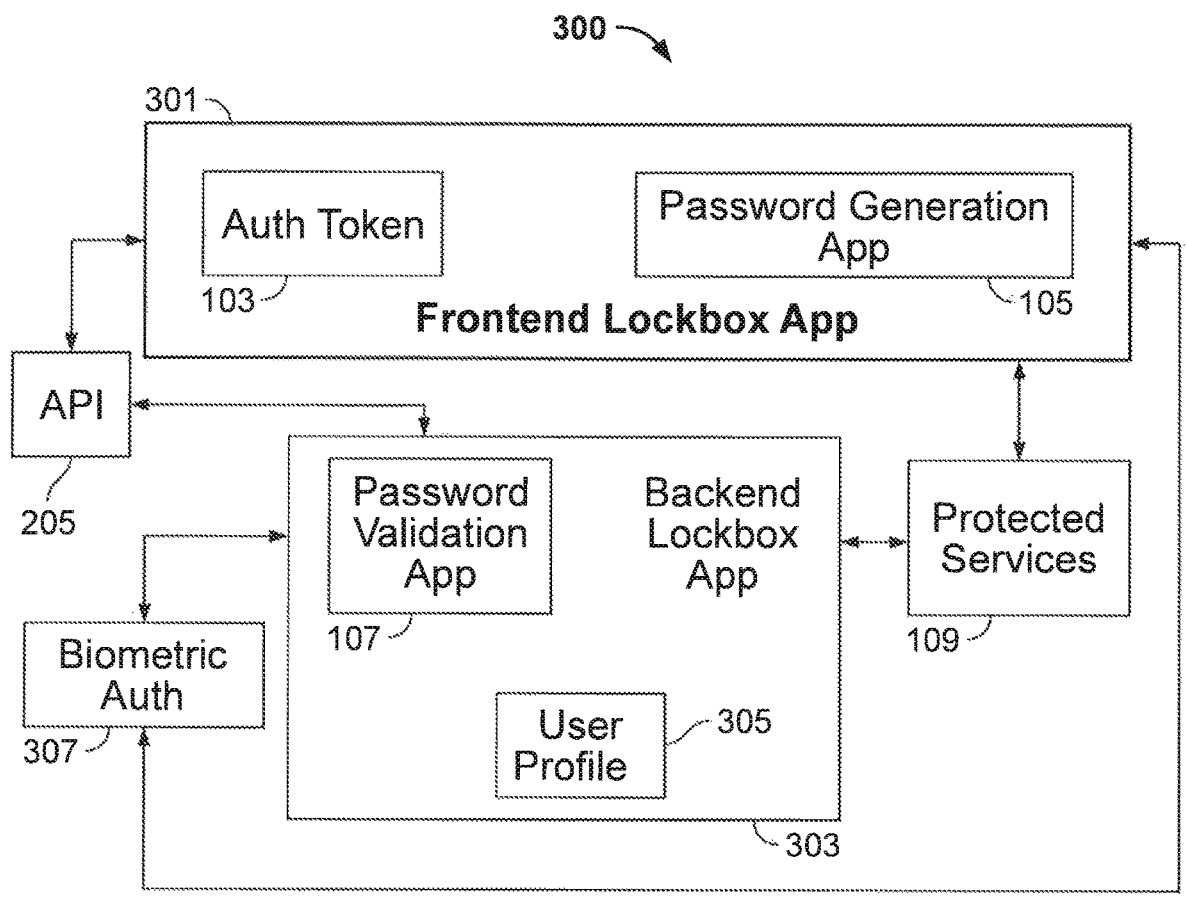
FIG. 3 shows an illustrative system in accordance with principles of the disclosure.

FIG. 3 shows illustrative system 300. System 300 includes frontend lock-box app 301. Frontend lock-box app 301 secures access to source authentication token 103 and password generation app 105. Frontend lock-box app 301 may be included in a secure OBP app installed on mobile device 101.

Access to frontend lock-box app 301 may be secured by biometric authentication 307. Biometric authentication 307 may include native biometric authentication processes operating on mobile device 101. Illustrative biometric authentication 307 may include facial recognition, iris or retina recognition or fingerprint recognition.

System 300 includes backend lock-box app 303. Backend lock-box app 303 may include password validation app 107. Via API 205, backend lock-box app 303 may receive dynamic password 201 from frontend lock-box app 301. Backend lock-box app 303 may utilize password validation app 107 to validate dynamic password 201. When dynamic password 201 is successfully validated by password validation app 107, backend lock-box app 303 may activate protected services 109 using user profile 305. As an additional security precaution, backend lock-box app 303 may require biometric authentication 307.

Activating protected services 109 using user profile 305 may include activating an app running on mobile device 101 that provides access to protected services 109 using user profile 305. User profile 305 may preferences, historical data or any other information that personalizes protected services 109 provided to a user. In some embodiments, access to protected services 109 using user profile 305 may be provided via frontend lock-box app 301.

Figure 4:
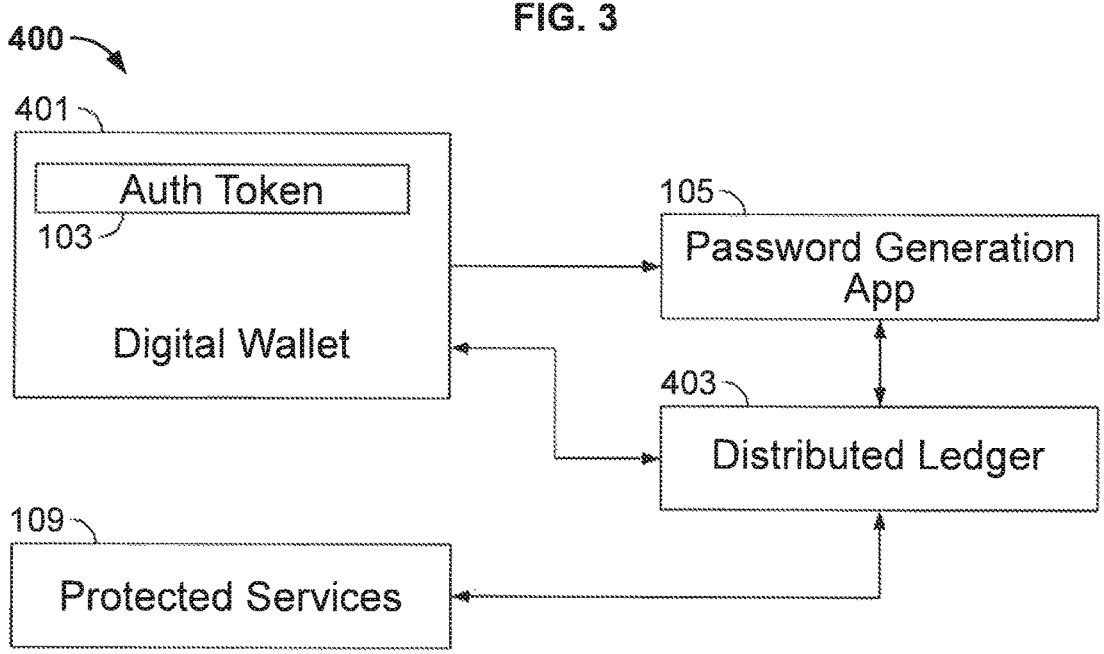
FIG. 4 shows an illustrative system in accordance with principles of the disclosure.

FIG. 4 shows illustrative system 400. System 400 includes digital wallet 401. Source authentication token 103 is stored in digital wallet 401. Digital wallet 401 is linked to protected services 109 via distributed ledger 403.

A smart contract running on distributed ledger 403 may automatically validate credentials provided by password generation app 105. For example, the smart contracts may automatically determine whether a dynamic password provided by password generation app 105 is associated with user profile 305 that is authorized to access protected services 109.

Protected services 109 may also initiate a request to digital wallet 401 for credentials. For example, a user may activate an app on mobile device 101 for accessing one or more of protected services 109. Before providing access to protected services 109, a request for credentials may be submitted to digital wallet 401. Digital wallet 401 may be a web-based wallet that is linked to one or more of protected services 109.

In response to the request received from the app that provides access to protected services 109, digital wallet 401 may interact with password generation app 105 to generate needed credentials (such as a dynamic password) using source authentication token 103. The generated credentials may then be validated by a smart contract running on distributed ledger 403.

Figure 5:
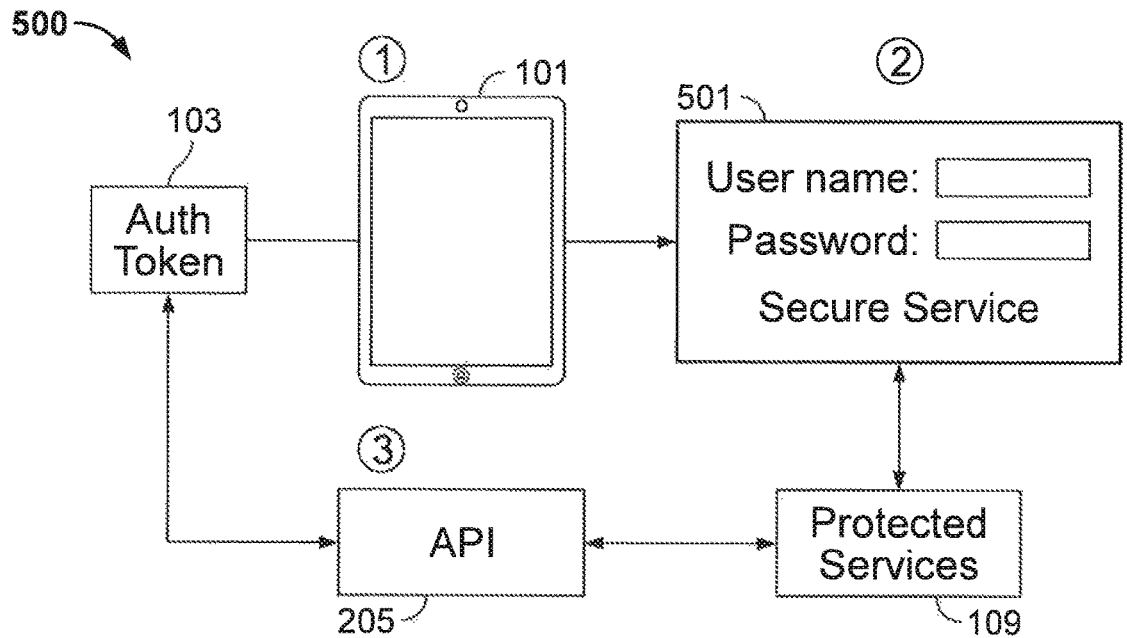
FIG. 5 shows an illustrative process in accordance with principles of the disclosure.

FIG. 5 shows illustrative process 500. Process 500 shows that at step 1, mobile device 101 has requested access to protected services 109. At step 2, in response to the request for access, webpage 501 is presented. Webpage 501 requires entry of a username and password to access the requested protected services 109. Conventionally, a user would need to enter a username and password associated with the requested protected services 109.

However, process 500 shows that at step 3, in response to detecting webpage 501, API 205 uses source authentication token 103 to bypass webpage 501 and the conventional requirement to enter a username and password into webpage 501 to access protected services 109. API 205 may automatically provision credentials for accessing source authentication token 103 to apps that provide protected services 109 without requiring any the use to provide manual entry of a username and password associated conventionally associated with requested protected services 109. In some embodiments, if an app that controls access to source authentication token 103 is already active on mobile device 101, no manual entry of user inputs may be required to authenticate access to protected services 109.

Figure 6:
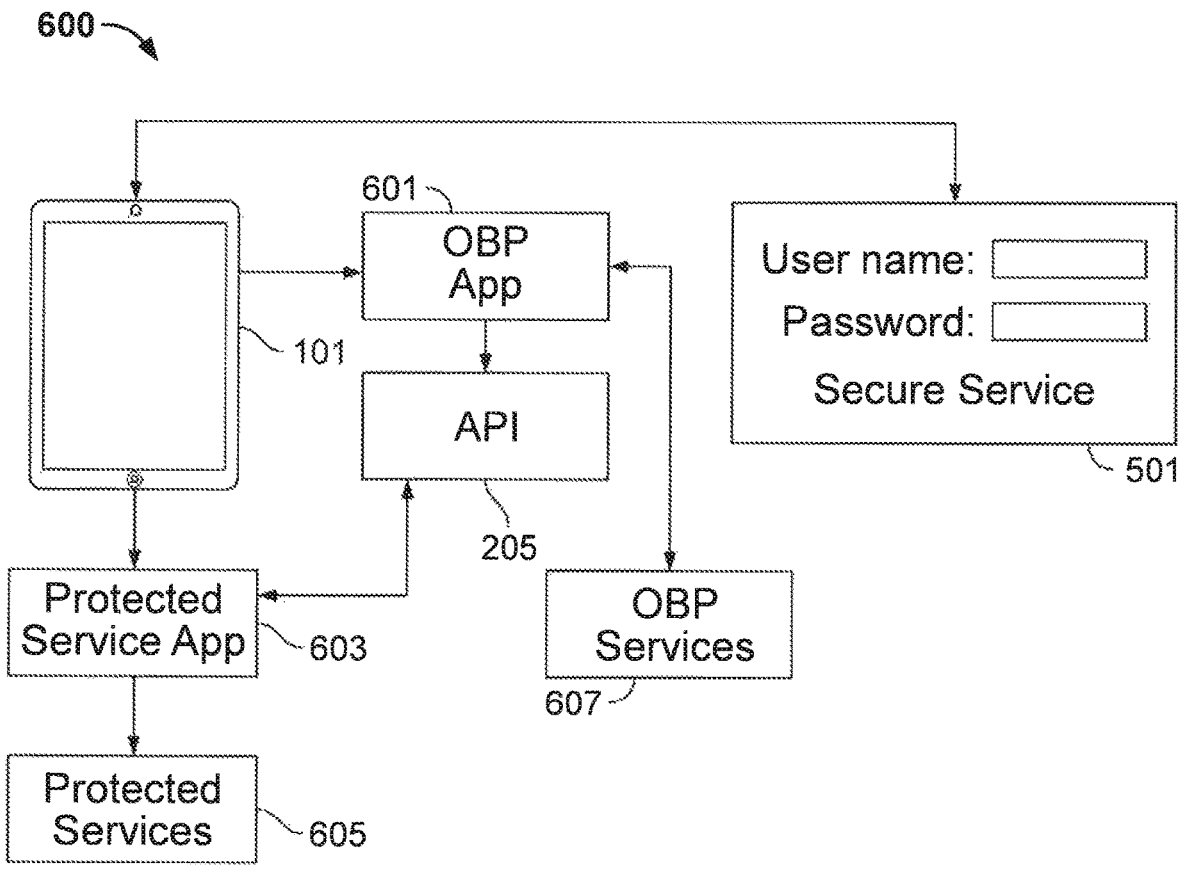
FIG. 6 shows illustrative system in accordance with principles of the disclosure.

FIG. 6 shows illustrative system 600. System 600 includes OBP app 601. OBP app 601 may require a username and password to access OBP services 607 via OBP app 601. OBP services 607 may be protected services. Mobile device 101 may also include protected service app 603. Protected service app 603 may provide a portal for accessing protected services 605. Conventionally, a user of mobile device 101 would need to enter a distinct set of authorization credentials via login screen 501 to access protected services 605.

System 600 shows that access to protected service 605 may be controlled by OBP app 601 and the credentials that authorize access to OBP services 607. API 205 detects activation of protected service app 603 on mobile device 101. API 205 requests that OBP app 601 generate credentials for accessing protected services 605. OBP app 601 may generate credentials for accessing protected services 605 using systems and methods described above in connection with FIGS. 1-5 or elsewhere herein.

API 205 may interact with protected service app 603. For example, API 205 may provide protected service app 603 with the credentials for accessing protected services 605 that have been generated by OBP app 601. In such embodiments, protected service app 603 may authenticate the credentials generated by OBP app 601. In other embodiments, API 205 may authenticate the credentials generated by OBP app 601. For example, API 205 may interact with a smart contract operating on distributed ledger 403 (shown above in FIG. 4). The smart contract may inform protected service app 603 whether the credentials generated by OBP app 601 have been successfully validated.

After successfully confirming that that the credentials generated by OBP app 601 are valid, protected service app 603 may allow access to protected services 605 via mobile device 101. Thus, using the credentials generated by OBP app 601, a user may be provided access to protected services 605 without having to remember or manually enter credentials specific to protected service app 603 or protected services 605.

Figure 7:
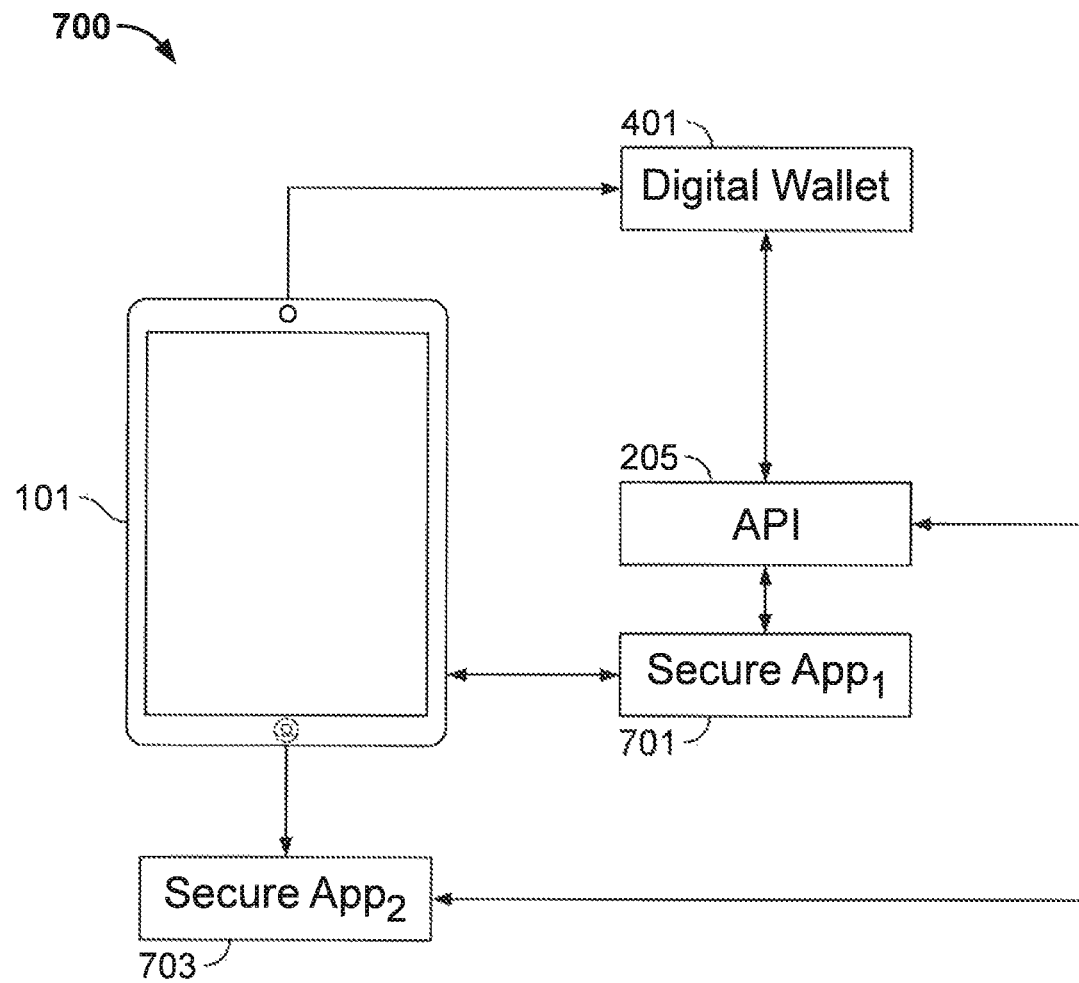
FIG. 7 shows illustrative system in accordance with principles of the disclosure.

FIG. 7 shows illustrative system 700. System 700 includes mobile device 101. Secure $app_1$ (701) and secure $app_2$ (703) each provide access to protective services via mobile device 101. Secure $app_1$ (701) and secure $app_2$ (703) may each provide access to different protective services. For example, secure $app_1$ (701) may provide access to an email account. Secure $app_2$ (703) may provide access to a social media account.

System 700 shows that API 205 may utilize credentials stored in digital wallet 401 to access protective services provided by secure $app_1$ (701) and secure $app_2$ (703). Thus, a user of mobile device 101 does not need to remember, secure or present distinct credentials to access the protective service provided by secure $app_1$ (701) and secure $app_2$ (703). The user only needs to secure credentials needed to access digital wallet 401.

Thus, apparatus and methods for an AUTHENTICATION BYPASS INFRASTRUCTURE are provided. Persons skilled in the art will appreciate that the present disclosure can be practiced by other than the described embodiments, which are presented for purposes of illustration rather than of limitation. The present disclosure is limited only by the claims that follow.

What is claimed is:

1. An authentication system for controlling secure access to multiple protected services, the authentication system comprising a processor and a memory, each of the protected services secured by an independently created password, the system comprising:
    an authentication token;
    a password generation application that autogenerates a dynamic password for any of the multiple protected services using the authentication token as a seed; and
    a password validation application that:
        receives the dynamic password;
        validates that the dynamic password has been generated using the authentication token as the seed; and
        provides or denies access to any of the multiple protected services based on the dynamic password.

2. The authentication system of claim 1 further comprising:
    a frontend lock-box application that stores the authentication token and secures access to the password generation application; and
    a backend lock-box application that links the multiple protected services to the authentication token stored in the frontend lock-box application.

3. The authentication system of claim 2, wherein the backend lock-box application stores a public cryptographic key that is used to validate the dynamic password.

4. The authentication system of claim 2 further comprising:
    a first communication channel that links the frontend lock-box application to the backend lock-box application; and
    a second communication channel that links the backend lock-box application to the multiple protected services.

5. The authentication system of claim 4, wherein:
    the first communication channel is encrypted using a first private cryptographic key; and
    the second communication channel is encrypted using a second private cryptographic key.

6. The authentication system of claim 1, wherein the dynamic password is a one-time password.

7. The authentication system of claim 1 further comprising a digital wallet that links the authentication token to the multiple protected services.

8. The authentication system of claim 7 wherein at least one of the multiple protected services is provided by a decentralized application operating on a distributed ledger.

9. The authentication system of claim 1, wherein the password generation application requires a second-factor authentication that is manually input by a user before autogenerating the dynamic password for any of the multiple protected services.

* * * * *